(12) United States Patent
Johnson

(10) Patent No.: US 7,832,681 B2
(45) Date of Patent: Nov. 16, 2010

(54) DISPENSER FOR COILED MATERIALS

(76) Inventor: James H. Johnson, 1078 Shenk Hollow Rd., Luray, VA (US) 22835

( * ) Notice: Subject to any disclaimer, the term of this patent is extended or adjusted under 35 U.S.C. 154(b) by 0 days.

(21) Appl. No.: 12/226,477

(22) PCT Filed: Apr. 10, 2007

(86) PCT No.: PCT/US2007/008748

§ 371 (c)(1),
(2), (4) Date: Oct. 20, 2008

(87) PCT Pub. No.: WO2007/127042

PCT Pub. Date: Nov. 8, 2007

(65) Prior Publication Data

US 2010/0001116 A1    Jan. 7, 2010

(51) Int. Cl.
*B65H 16/02* (2006.01)
(52) U.S. Cl. ................ 242/588; 242/129; 242/566; 242/588.6; 242/615.3
(58) Field of Classification Search .............. 242/403.1, 242/406, 557, 566, 129.8, 615, 615.3, 588, 242/588.3, 588.6, 597.7
See application file for complete search history.

(56) References Cited

U.S. PATENT DOCUMENTS

| | | | | |
|---|---|---|---|---|
| 1,873,422 | A | * | 8/1932 | Keller ...................... 242/128 |
| 1,908,073 | A | | 5/1933 | Spoor et al. |
| 2,954,942 | A | | 10/1960 | Raus |
| 3,323,752 | A | * | 6/1967 | Kurtz et al. ............ 242/129.8 |
| 3,464,647 | A | | 9/1969 | Jacobi |
| 3,593,943 | A | | 7/1971 | Collmann |
| 3,721,394 | A | * | 3/1973 | Reiser .................... 242/129.8 |
| 3,815,842 | A | | 6/1974 | Scrogin |

(Continued)

FOREIGN PATENT DOCUMENTS

JP    6-144714    5/1994

(Continued)

OTHER PUBLICATIONS

"Wire Wheel," Assoc-Elec-Prod.com http://www.assoc-elec-prod.com/WWBenefits.htm, 2 pages, printed from the Internet Jan. 12, 2006.

(Continued)

*Primary Examiner*—William A Rivera
(74) *Attorney, Agent, or Firm*—Richard C. Litman

(57) ABSTRACT

The dispenser for coiled materials (10, 10*a*) allows the installation of a coil of material (C) without unrolling the material and then rewinding it onto the dispenser A rotationally stationary base (12) has a rotating reel mounted on the base. The reel has a permanently installed flange and a removable flange (26) secured to the assembly by an axle. The removable flange (26) includes a spring to hold the removable flange securely against the coil of material (C) between the flanges (22, 26), thereby precluding significant looseness or play of a partially depleted coil. The assembly is preferably sufficiently narrow axially to permit passage between conventionally spaced sixteen-inch ' on-center wall studs. The removable flange (26) may be removed, along with any centering guides, and a larger spool of material placed upon the permanent flange. A roll-around caddy may be used for dispensing larger and heavier coiled material.

6 Claims, 9 Drawing Sheets

U.S. PATENT DOCUMENTS

| | | | |
|---|---|---|---|
| 3,990,653 A * | 11/1976 | Marcell | 242/129.8 |
| 4,089,486 A | 5/1978 | Carter | |
| 4,184,647 A | 1/1980 | Rourke | |
| 4,471,921 A | 9/1984 | Corbin | |
| 4,667,897 A | 5/1987 | Burrow et al. | |
| 4,747,561 A | 5/1988 | Sweeny et al. | |
| 4,826,100 A | 5/1989 | Belliveau | |
| 4,953,810 A | 9/1990 | Stadig | |
| 6,145,781 A * | 11/2000 | Kawabe et al. | 242/588.6 |
| 6,326,547 B1 * | 12/2001 | Saxby et al. | 242/615 |
| 6,655,627 B2 | 12/2003 | Patton | |
| 6,676,068 B2 * | 1/2004 | Emes | 242/597.7 |
| 2002/0066822 A1 | 6/2002 | Emes | |

FOREIGN PATENT DOCUMENTS

JP  7-237825  9/1995

OTHER PUBLICATIONS

"Whirlwind—WD5 Cable Reel," Samash.com http://www.samash.com/catalog/showitem.asp?SKU=WWD5XXXXX, 1 page, printed from the Internet Jan. 12, 2006.

"Canare Cable Reel," Store.Yahoo.com http://store.yahoo.com/yhst-3455591325931/r3001.html, 1 page, printed from the Internet Jan. 12, 2006.

* cited by examiner

DISPENSER FOR COILED MATERIALS

TECHNICAL FIELD

The present invention relates generally to reels and similar devices for holding and dispensing coiled materials of various types. More specifically, the present invention relates to a dispenser for coiled materials suitable for storing and dispensing such materials as Romex® cable for electrical wiring projects and similar materials.

BACKGROUND ART

Innumerable varieties of elongate flexible materials, such as cord, cable, chain, twine, electrical wire of various types, etc., are commonly provided to the consumer in the form of coiled rolls. Many such materials, particularly in the form of longer and/or heavier coils, can be cumbersome to manipulate and dispense. An example of such is Romex® electrical wiring, which is formed of two or more solid strands of insulated copper wire encased in a relatively heavy plastic sheath. Much wiring of stationary structures (e.g., homes, small businesses, etc.) is done with three conductor Romex® type wire, comprising two conducting wires and a ground wire. Such three-conductor wire, particularly in larger diameter gauges, is awkward to manipulate and dispense for any given length of the material.

Most such wire is provided in boxes or plastic wrap in relatively shorter lengths of up to two hundred fifty feet or so. The packaging provides for the dispensing of the wire therefrom by opening a hole in the center of the packaging and drawing the wire from the center of the roll or coil outwardly through the hole. In practice, this technique does not work out particularly well. Since the wire is coiled in its packaging and is relatively stiff, the wire twists with each loop that is drawn from the packaging and must be untwisted before proper installation. The alternative is to rotate the package as the wire is withdrawn, which is also a tedious procedure. Moreover, as the wire is used, the package becomes quite light, and the stiffness of the wire (particularly in heavier gauges) results in the wire resisting its withdrawal from the packaging and dragging the entire package around. Longer lengths of wire (e.g., one thousand feet) are normally provided on large spools, but much the same problems exist when dispensing wire from such large spools as well.

While such boxed or packaged rolls or coils of electrical wiring are relatively compact, at least in shorter lengths, the various spools, reels, and caddies developed in the past for such wire rolls are not particularly compact. Most stationary structures are constructed with wall studs spaced sixteen inches on-center in order to position every third vertical stud four feet apart from one another, the standard width of a sheet of wallboard, plywood, etc. used in construction. This results in a space or passage of only fourteen and one-half inches between the faces of adjacent studs when standard "two-by-four" studs of one and one-half inch thickness are used. While a packaged roll or coil of wire in a relatively shorter length may be passed between adjacent wall studs, the problem remains of twisting and tangling of the wire as it is dispensed from the packaging.

Thus, a dispenser for coiled materials solving the aforementioned problems is desired.

DISCLOSURE OF INVENTION

The disclosure is directed to a dispenser for coiled materials. The dispenser includes a rotational bearing support plate assembly that is attached to a base. A first flange is attached to the support plate assembly. An axle extends from the first flange. The axle is removeably attached to a second flange. A bias spring urges the second flange toward the first flange. The spring-biased flanges are adapted for capturing a coil of material and preventing excessive play of the coil between the second flange and the first flange.

The disclosure is also directed to a dispenser for coiled materials that includes a wheeled caddy. The dispenser includes a rotational bearing support plate assembly that is attached to a base. A first flange is attached to the support plate assembly. An axle extends from the first flange. The axle is removeably attached to a second flange. A wheeled caddy frame is removably secured to the base opposite the bearing support plate assembly.

The disclosure is further directed to an adjustable dispenser for coiled materials. The dispenser includes a rotational bearing support plate assembly that is attached to a base. A first flange is attached to the support plate assembly. An axle extends from the first flange.

The axle is removeably attached to a second flange. An adjustably positioned material dispensing guide is attached to the base.

BRIEF DESCRIPTION OF THE DRAWINGS

Similar reference characters denote corresponding features consistently throughout the attached drawings.

BEST MODES FOR CARRYING OUT THE INVENTION

The present invention comprises a dispenser for coiled materials, e.g., Romex® electrical wiring, cable, cord, chain, etc. The dispenser has a rotary reel mounted atop a rotationally stationary base. The reel includes a first flange permanently secured to the base, a bearing structure between the first flange and the base, and a removable second flange opposite the first flange. Centering guides and a spring-biased upper flange hub provide for the retention of a coil of material (e.g., electrical wire, etc.) upon the assembled reel. The spring-biased hub serves to hold the upper flange securely against the coil of material captured between the two flanges, thereby precluding any substantial play of a significant quantity of material upon the reel. A payout guide extends from the base, and may be reversed to guide the dispensing of the material in either a clockwise or counterclockwise rotation. Preferably, the maximum axial width of the device is no greater than fourteen and one-half inches in order to allow the device to pass between conventionally spaced sixteen-inch on-center wall studs.

The device permits the upper flange and centering guides to be removed for the placement of a larger spool of coiled material upon the lower flange. The guide may be repositioned to guide the dispensing of material from the larger spool. A roll-around caddy may be provided beneath the base to facilitate the movement of the device from place to place when it is loaded with a larger spool of material. Small parts (centering guides, pins, etc.) may be secured within a toolbox or container provided with the caddy.

Figure 1:
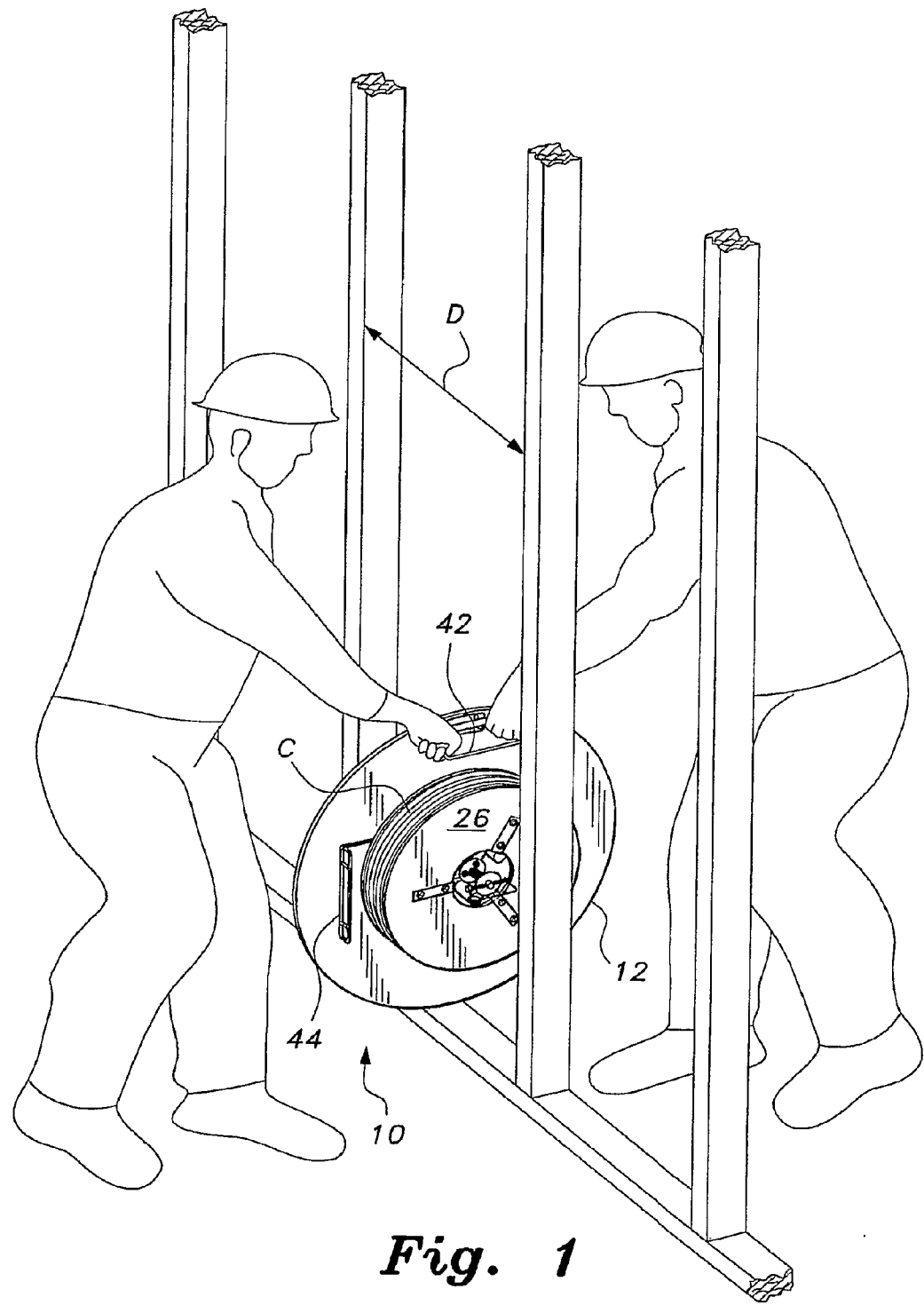
FIG. 1 is an environmental, perspective view of a first embodiment of a dispenser for coiled materials according to the present invention, showing its transfer through a partially completed framed wall structure.
Figure 2:
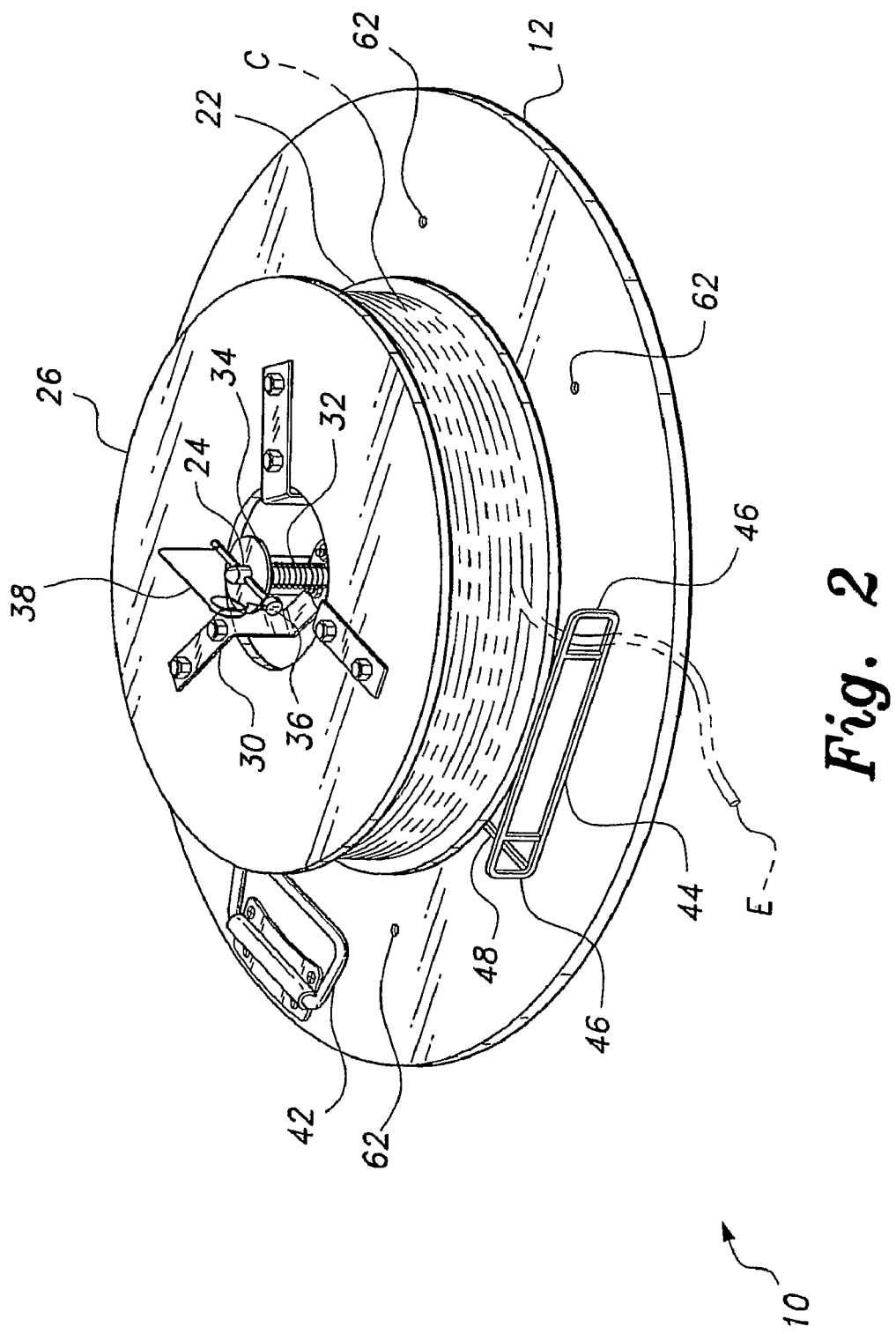
FIG. 2 is a detailed perspective view of the dispenser of FIG. 1, showing further details thereof.
Figure 3:
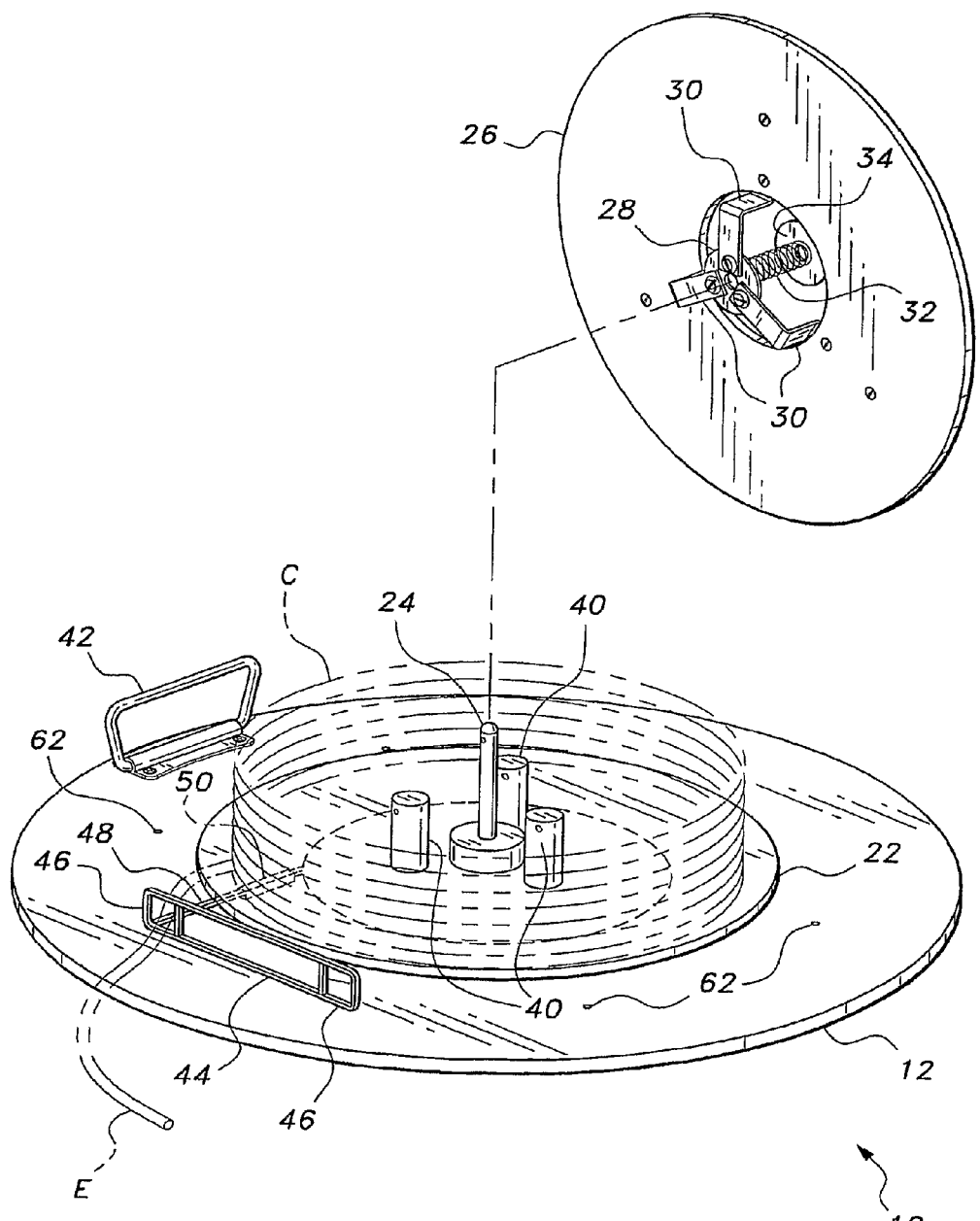
FIG. 3 is an exploded perspective view of the dispenser of FIGS. 1 and 2, showing the assembly of the removable reel flange thereto.
Figure 4:
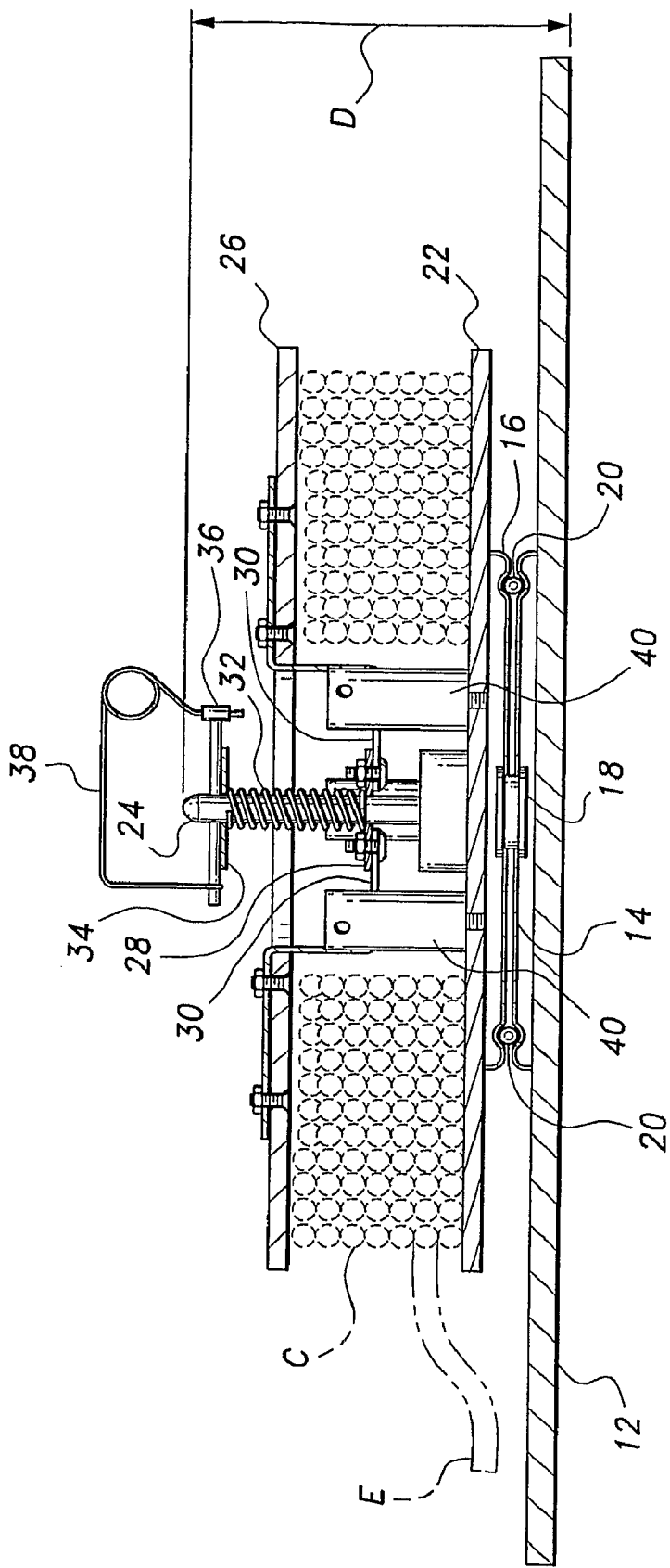
FIG. 4 is a side elevation view in section of the assembled dispenser of FIGS. 1 through 3, showing further details thereof.

FIG. 1 generally depicts the dispenser and shows the relative size of the dispenser which allows the device to be transferred through relatively narrow areas, e.g., between vertical studs in an unfinished wall structure. FIGS. 2 through 4 provide more detailed views of a first configuration of the dispenser for coiled materials 10, which is configured for the carriage, storage, and dispensing of a relatively small coil C of material. The dispenser 10 includes a rotationally stationary base 12, i.e., the base does not rotate relative to the coil C of material placed thereon. The base 12 is formed of a rigid sheet of thin, flat material and is preferably circular in order to permit the dispenser 10 to be rolled on edge for moving it from place to place, but the base 12 may be any practicable shape or configuration.

A "lazy Susan" type rotational bearing support plate assembly is installed centrally upon one surface of the base 12, as shown in the sectional elevation view of FIG. 4. The support plate assembly comprises a stationary bearing support plate 14 immovably affixed to the base 12, and a relatively rotary bearing plate 16 rotationally affixed to the stationary bearing plate 14 by a pivot 18, which holds the two bearing plates 14 and 16 closely together. A series of bearings 20 are captured in mutually facing peripheral channels formed in the two bearing plates 14 and 16, to facilitate rotation of the rotary bearing plate 16 (and structure attached thereto) relative to the stationary bearing plate 14 immovably affixed to the base 12.

A coil reel first flange 22 is permanently and immovably affixed to the rotary bearing plate 16 to rotate therewith relative to the base 12. An axle 24 for the reel assembly extends from the center of the first flange 22 on the opposite side of the flange 22 from its attachment to the rotary bearing plate 16. A second flange 26 is removably secured to the axle 24 to capture a coil C of material between the two flanges 22 and 26, as described below. The two reel flanges 22 and 26 of the rotary reel assembly are preferably circular, with the circular base plate 12 preferably having a larger diameter than the two flanges 22 and 26 to allow the dispenser 10 to be rolled on edge while providing clearance for the reel assembly and coil C thereon from the underlying surface, and also providing a surface on the larger diameter base 12 for the attachment of other components clear of the reel assembly.

The removable second flange 26 is axially adjustable on the reel axle 24 in order to provide variable spacing between the two flanges 22 and 26 and accommodate different axial thicknesses of coiled material C installed upon the reel assembly. The mechanism allowing for the adjustable positioning of the second reel flange 26 relative to the first reel flange 22 along the axle 24 is most clearly illustrated in FIGS. 3 and 4 of the drawings. The second flange 26 includes an axially offset hub 28 secured to the opening in the second flange 26 disc by a plurality of radial arms 30. The offset hub 28 is positioned within the open center of the coil C of material placed in the reel assembly when the reel flange 26 is installed upon the axle 24.

Figure 5:
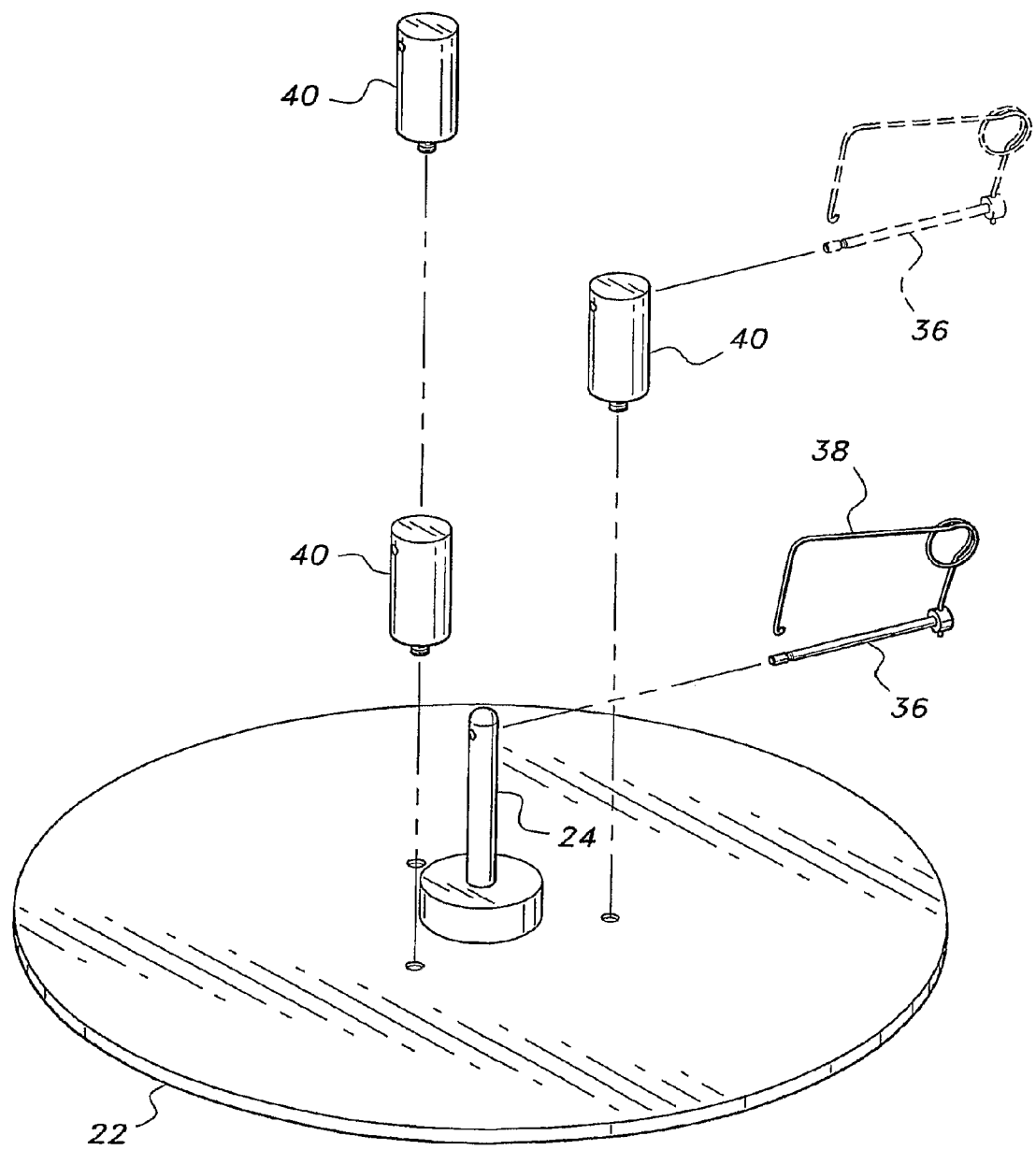
FIG. 5 is a detailed, exploded perspective view of the removable components of the base flange of the dispenser of FIGS. 1-4, readying the device for use with a larger roll of coiled material.

A helical compression spring 32 and washer 34 are installed concentrically upon the hub 28 and concentrically about the axle 24 when the second flange 26 is installed upon the axle 24. Preferably, the spring 32 and washer 34 are permanently affixed to the hub 28, in order to preclude their separation and loss from the hub 28 and second flange 26 assembly. A transverse retainer pin 36 is removably installed through a passage in the distal end of the axle 24, with a safety keeper 38 preventing the pin 36 from inadvertently escaping from its installation through the axle 24 passage. This structure is most clearly shown in FIG. 5 of the drawings.

It will be seen that the second flange hub 28 is free to move axially along the axle 24, with only the pressure of the spring 32 urging the hub 28 toward the opposite first flange 22. As the hub 28 moves, so does the second flange 26, as the hub 28 is immovably affixed to the second flange 26 by the radially disposed connecting arms 30. When a relatively lengthy coil C of material is placed upon the first flange 22, the thickness of the coil C results in the second flange 26 being spaced at some distance from the first flange 22. However, the coil spring 32 is compressed between the washer 34, which is held in position at the distal end of the axle 24 by the retainer pin 36, and the second flange hub 28.

As the material on the coil C is dispensed and depleted from the reel assembly, the height of the coil C is reduced. The spring 32 urges the hub 28, and thus the second flange 26, toward the opposite first flange 22, thus taking up any slack between the two flanges as the material of the coil C is dispensed and depleted. A series of removable coil centering guides 40 are positioned radially adjacent the axle 24 and extend from the first flange 22, and provide further positive positioning for a coil C of material placed upon the reel assembly by precluding excessive lateral movement of the coil C between the two reel flanges 22 and 26.

The length of the axle 24 and depth of the axial offset of the second flange hub 30 is preferably limited to a predetermined maximum total. Preferably, the axial span or distance D between the bottom of the base 12 and the outer face of the second flange 26 (indicated in FIG. 4) is no greater than the span or distance D between adjacent sixteen-inch on-center wall studs (indicated in FIG. 1), or a maximum of fourteen and one-half inches when conventional "two-by-four" lumber having a thickness of one and one-half inches is used in construction. This allows the dispenser 10 to be passed between adjacent wall studs in an unfinished wall structure, as shown in FIG. 1, thus greatly facilitating the transfer of the device from point to point in a construction project.

The coiled material dispenser 10 includes additional features for further convenience of the user of the device. One such feature is a handle 42 pivotally extending from the base 12 of the device. The handle 42 facilitates manipulation of the device when it is being transferred from one location to another, generally as indicated in FIG. 1 of the drawings. An additional handle could be installed generally diametrically opposite the first handle 42, if so desired, and/or other handles could be placed at other locations upon the base 12. An example of such is illustrated in broken lines in FIG. 8.

A material dispensing guide 44 is also preferably provided with the dispenser 10, as shown in FIGS. 1 through 3. The guide 44 is also shown in a different position in the dispenser 10a of FIG. 8, with that embodiment being discussed further below. The guide 44 comprises a frame of relatively thin material and has a low, generally rectangular configuration, with symmetrically disposed guide eyelets 46 at opposite ends thereof. The two guide eyelets 46 permit the wire, cable, cord, etc., being dispensed from the coil C installed in the dispenser 10 to feed from the coil C in either left-hand orientation (as shown in FIG. 3) or right-hand orientation (FIG. 2) without regard to the orientation of the coil C when it is installed between the two reel flanges 22 and 26.

Figure 8:
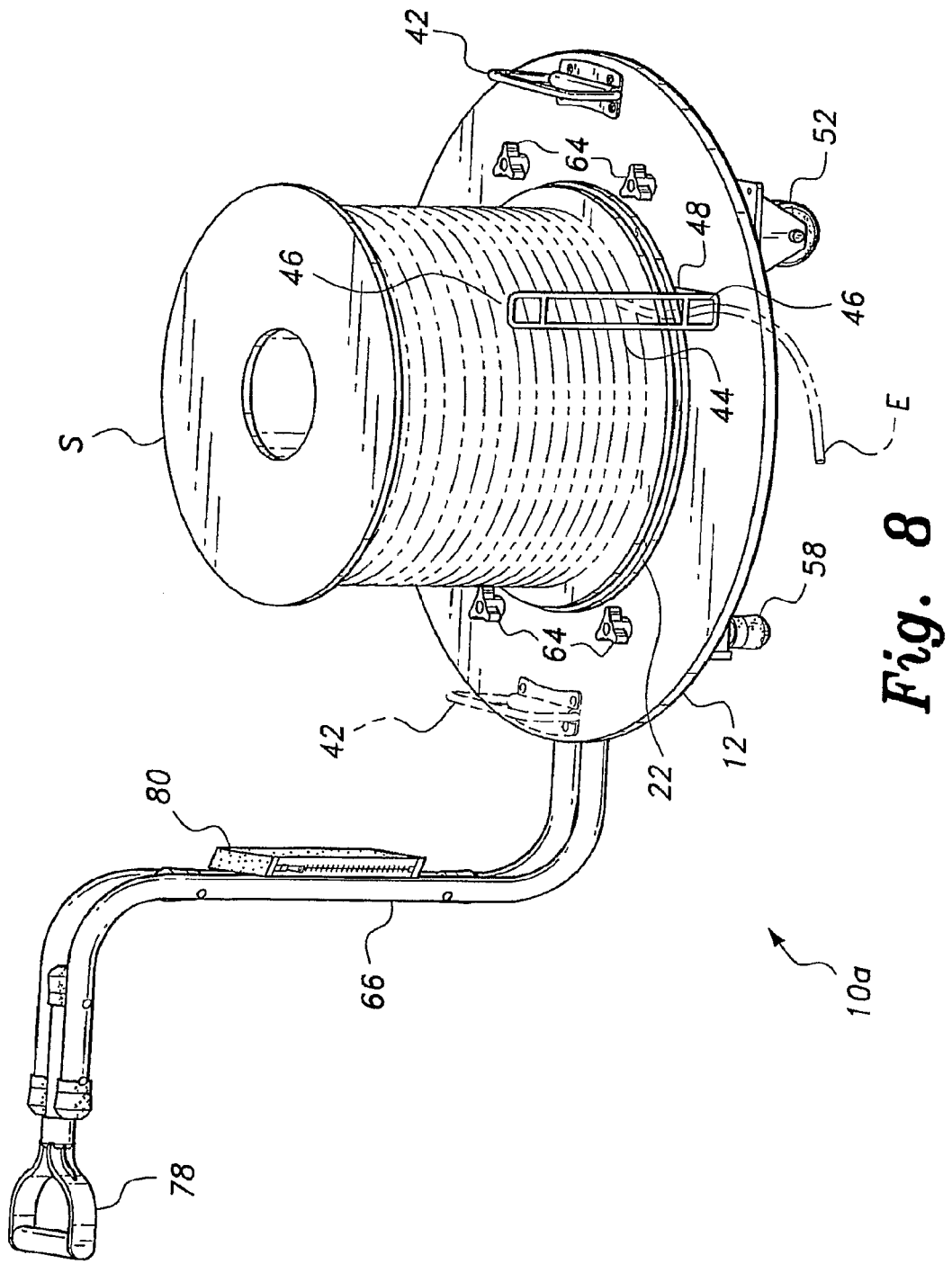
FIG. 8 is a perspective view of the dispenser base, caddy, and handle assembly of FIGS. 6 and 7, showing their use in the carriage of a larger spool of coiled material.
Figure 9:
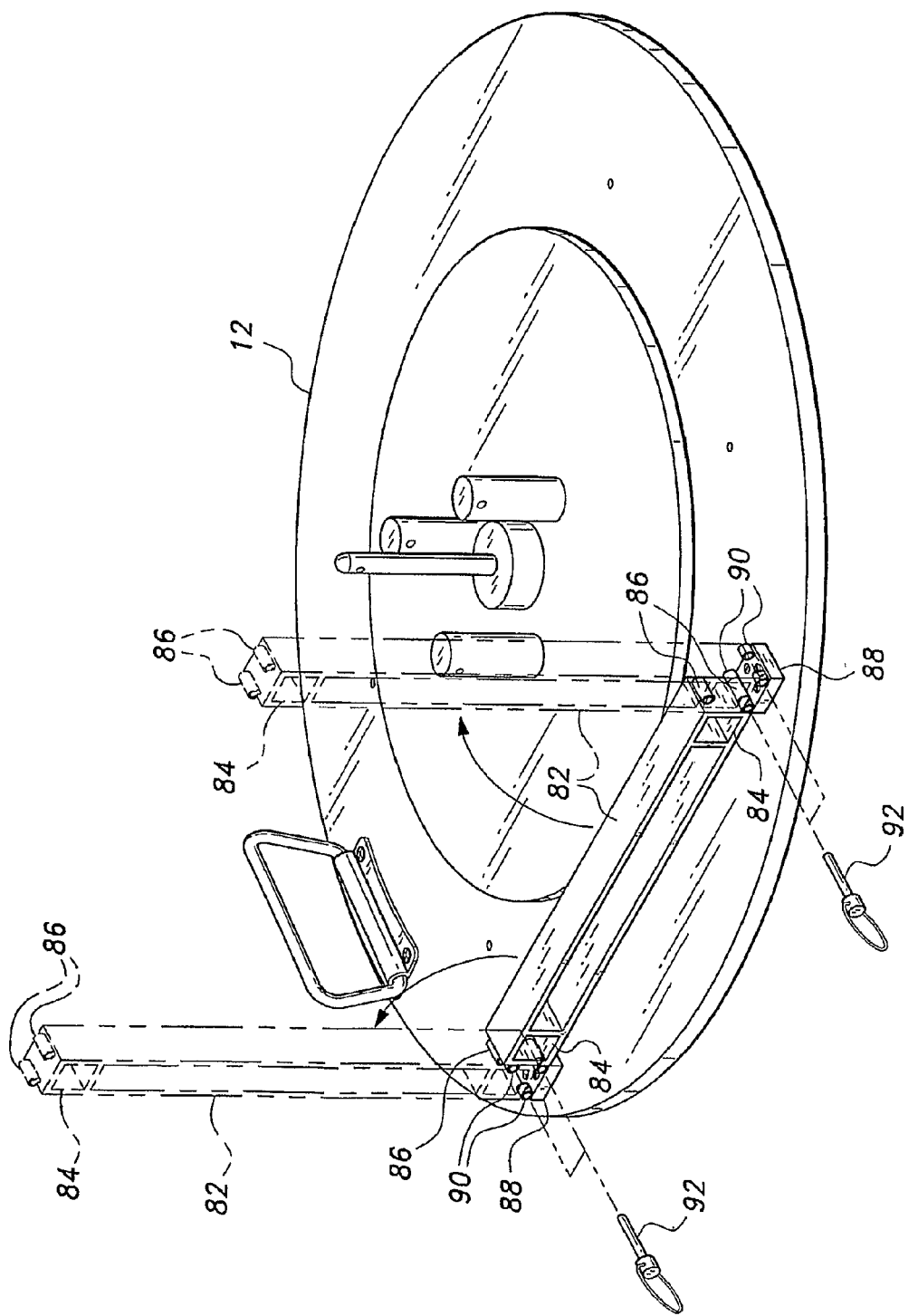
FIG. 9 is a perspective view of a dispenser base for a dispenser for coiled materials according to the present invention with an alternative material dispensing or payout guide installed thereon, showing its operation.

A single attachment arm 48 extends from the guide 44 normal to the plane of the guide eyelets rectangle. The arm 48 seats in a guide attachment socket 50, which is secured to the base 12 adjacent the stationary bearing plate 14. The socket 50 and the guide attachment arm 48 are preferably formed of closely mating square section rod or tube in order to secure the guide 44 either parallel to the base 12 (as shown in FIGS. 1 through 3 and 6) or perpendicular to the base 12 (as shown in FIG. 8). A conventional retaining pin (not shown) may be installed transversely through the socket 50 and attachment arm 48 to secure the guide 44 to the base 12. FIG. 9 illustrates an alternative material dispensing guide, discussed further below. Further alternative dispensing guides may comprise staples, eyelets, or the like (not shown) immovably secured to the stationary base 12 at suitable locations.

The dispenser for coiled materials 10 is used generally as shown in FIG. 2 of the drawings, with the coiled material C being fed from between the two reel flanges 22 and 26 and through one of the guide eyelets 46. As the guide 44 is affixed to the relatively stationary base 12, and the reel assembly, comprising the two reel flanges 22 and 26 and hub structure described in detail further above, is free to rotate by means of the bearing plate assembly shown in FIG. 4, the coil C of material will rotate with the reel assembly as the payout end E of the material is fed through the guide eyelet 46. Thus, the dispenser 10 enables the wire, cord, etc. to be dispensed smoothly from the coil C without twisting or otherwise misaligning the elongate material as it is dispensed.

The configuration of the above-described dispenser for coiled materials 10 shown in FIGS. 1 through 4 is primarily adapted for use in the carriage and dispensing of a relatively small coil of material, e.g., a 250-foot length of Romex® wire or the like. However, the dispenser 10 may be quickly and easily reconfigured to form a dispenser 10a for the carriage and dispensing of material from a larger coil, if so desired. FIGS. 5 through 8 illustrate the procedure involved in the reconfiguration of the dispenser 10 to form a dispenser for coiled materials 10a for use with larger and heavier spools of coiled material.

Typically, larger coils of material, e.g., a one thousand foot length of wire, are provided on a solid spool S, as shown generally in FIG. 8 of the drawings. Accordingly, the coil centering guides 40 installed on the reel first flange 22 may be removed, as shown generally in FIG. 5 of the drawings, as they are not needed to center a spooled coil of material. The centering guides 40 may be installed and removed by hand, or diametric holes or passages may be formed therethrough and a tool, e.g., the hub retainer pin 36, temporarily inserted through the hole of each guide 40 to loosen the guide 40 from its attachment to the underlying first flange 22. The pin 36 may also be used to apply greater leverage to the guides 40 when installing the guides upon the first flange 22.

Figure 6:
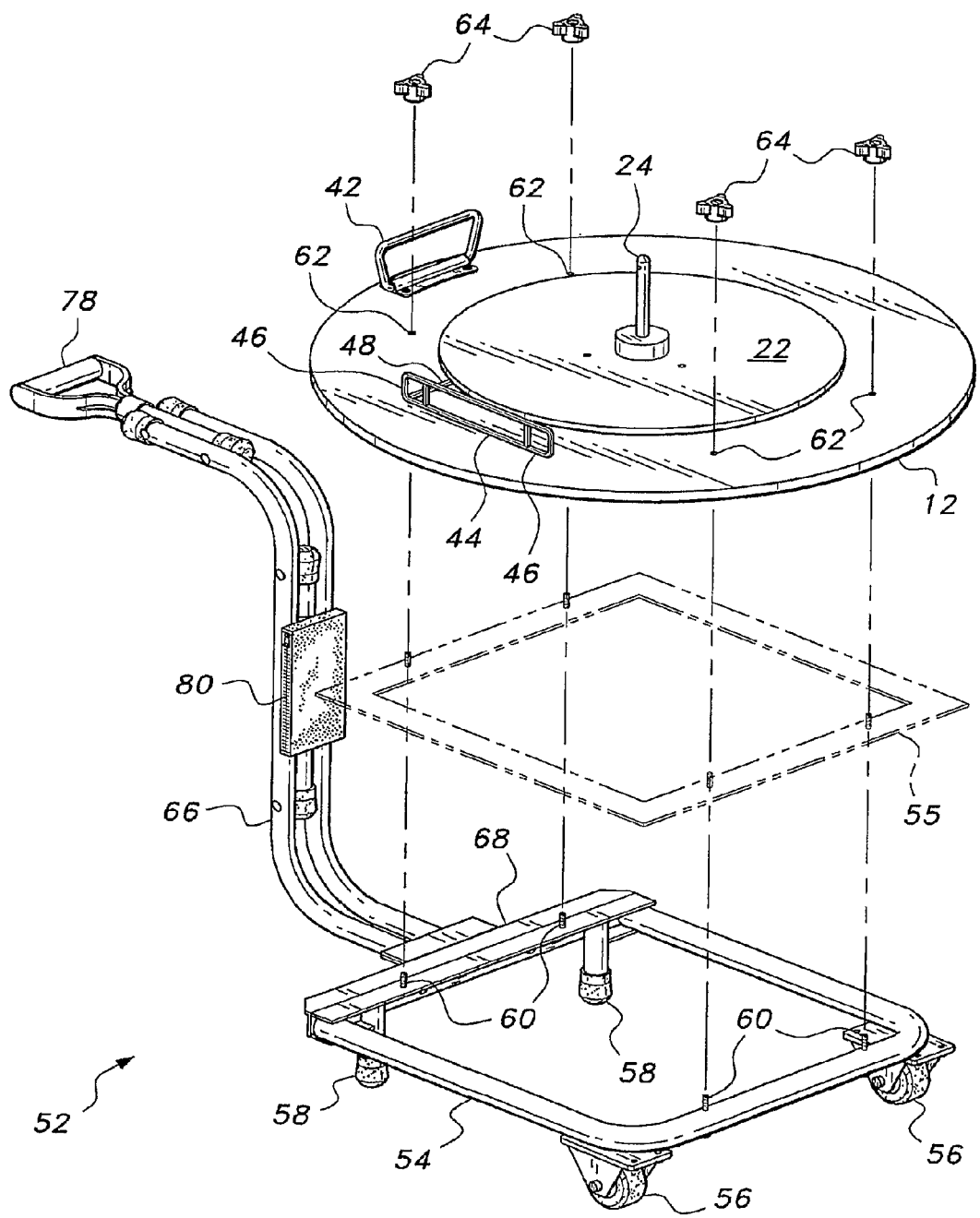
FIG. 6 is an exploded perspective view of the dispenser base assembly and a caddy or cart for the dispenser of FIGS. 1-5, which may be removably secured thereto.
Figure 7:
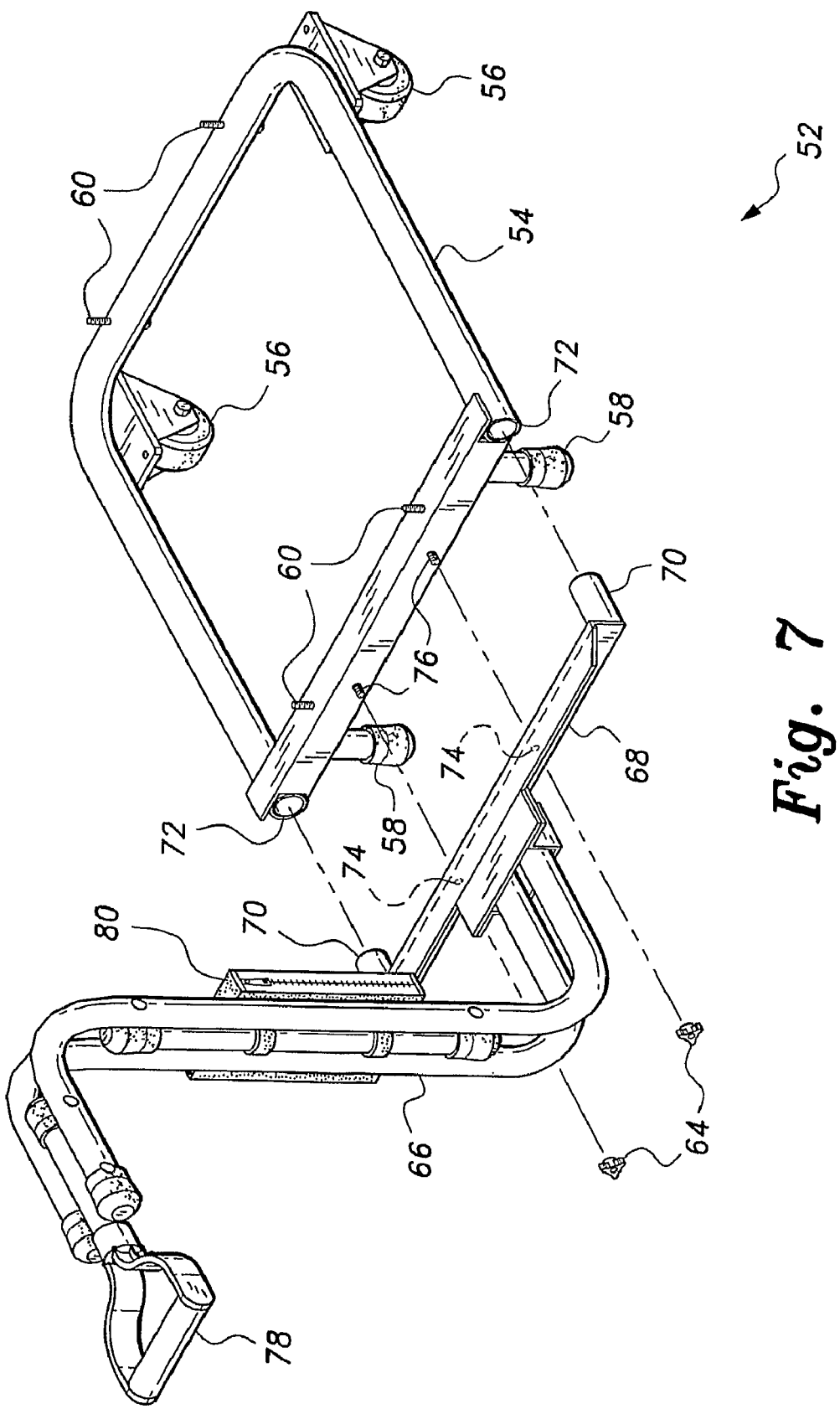
FIG. 7 is a detailed exploded perspective view of the caddy or cart of FIG. 6, showing the removable attachment of the handle thereto.

Such large spools of wire (or perhaps other coiled material) are generally quite heavy as well, perhaps weighing on the order of one hundred pounds or more. Accordingly, the dispenser 10a cannot be carried conveniently by hand, with such a large and heavy load installed thereon. The coiled material dispenser 10a overcomes this problem by means of a wheeled dolly or caddy frame 52, as shown in FIGS. 6 and 7. The caddy 52 comprises a lower support structure 54, which may be formed of round or square section steel tube, angle iron, or other suitably sturdy material. A pair of wheels 56 (preferably non-castering, although casters may be used if so desired) is provided at one side of the lower structure 54, and a pair of support legs 58 is provided at the other side of the structure 54 opposite the wheels 56. The height of the wheels 56 and support legs 58 are adapted to provide a level support for a spool S of coiled material resting atop the lower structure 54 when lower structure 54 is resting upon a level surface, with the legs 58 and wheels 56 preferably being relatively low in height in order to provide a low center of gravity for the assembly for greater stability. Preferably, the wheels 56 and legs 58 are relatively widely spread in order to maximize the stability of the assembly when loaded.

The lower structure 54 is removably secured beneath the base 12 opposite the bearing support plate assembly by means of a plurality of threaded base-attachment studs 60, which extend upwardly from the lower structure 54 to pass through corresponding holes 62 in the base 12. A corresponding series of hand-actuated threaded fasteners 64, e.g., wing nuts, etc., are provided to secure the base 12 atop the lower structure 54.

It can prove difficult to align the four base-attachment studs 60 in a precisely rectangular array directly upon the lower structure 54 due to slight warping and misalignment that may occur during welding assembly of the structure. Accordingly, a separate base-attachment frame 55 may be formed of suitable material, e.g., flat stock, etc., and the base-attachment studs may be secured (e.g., welded, etc.) to the frame 55 in an alignment fixture. The frame 55 is then permanently attached (welded, etc.) to the underlying lower structure 54. The provision of such a frame 55 with the base-attachment studs 60 attached to the frame, the frame then being welded to the underlying lower structure 54, can facilitate the positioning of the base-attachment studs in a precisely rectangular pattern to allow placement of the base disc 12 in either of two orientations upon the lower structure 54.

The caddy 52 preferably includes a removable elevated handle extension 66 to facilitate maneuvering the assembly while standing or walking upright. The handle extension 66 includes a transverse attachment member 68, with two mutually opposed plugs 70 that engage corresponding sockets 72 in the support structure 54. This provides a more rigid and sturdy attachment for the handle extension 66 to the support structure 54 when the handle extension 66 is attached to the support structure 54. The removability of the handle extension 66 from the support structure 54 provides for more compact transport and storage of the assembly when it is not in use.

The handle extension 66 extends upwardly and rearwardly from the attachment member 68, with the horizontal span of the extension 66 providing leverage to facilitate the lifting of the legs 58 of the caddy when maneuvering a heavy load thereon. The attachment member 68 includes two spaced apart holes 74 therethrough, which fit over corresponding threaded handle extension attachment studs 76 extending rearwardly from the support structure 54. Corresponding hand-actuated threaded fasteners 64 identical to the fasteners 64 used to secure the base 12 to the support structure 54, or other fasteners, may be used to secure the attachment member 68 to the support structure 54.

The handle extension 66 may comprise a pair of closely spaced tubes or the like for greater strength, as shown, or a single tube or other sturdy structure may be used. The use of two closely spaced tubes provides for the installation of a single, centrally positioned handgrip 78 extending from between the distal ends of the tubes. Also, a retaining member may be secured between the two handle extension tubes to provide for the attachment of a storage container 80 (e.g., zippered bag, a rigid container, etc., as desired). The storage container 80 provides for the storage of small parts therein, e.g., the various fasteners 64, wire nuts, and other fasteners, etc.

The dispenser 10a of FIG. 8 provides for the carriage of a relatively large spool S of wire or other coiled material thereon, and for the dispensing of such coiled material from the spool S while placed upon the dispenser 10a. As the spool S is relatively tall in comparison to the smaller coil C of material shown with the embodiment 10 of FIGS. 1 through 4, the dispensing guide 44 is turned to provide a vertical orientation for the elongate shape of the guide. The end E of the coiled material extending from the spool S may be passed through the elongate central portion of the guide 44, rather than through either of the eyelets 46 as would be the case when the guide 44 is turned with its major axis adjacent to the base 12 for the dispensing of coiled material from a smaller coil. While the dispenser 10a cannot fit between adjacent sixteen-inch on-center wall studs when carrying a large spool S thereon, it is relatively easily moved from point-to-point by means of the wheeled caddy or undercarriage 52 and the handle extension 66 removably attached thereto. For example, the undercarriage 52, and particularly the handle extension 66 extending therefrom, greatly facilitate the transport of the dispenser 10a up or down a flight of stairs or the like by two workers. One worker may support one end of the device 10a by the handle 42 extending from the base 12, while the second worker supports the opposite side of the device by the handgrip 78 extending from the distal end of the extension 66.

FIG. 9 of the drawings provides an illustration of a dispenser base 12 having an alternative material dispensing guide, designated as guide 82. The guide 82 has a configuration somewhat like that of the dispensing guide 44 shown in FIGS. 1 through 3, 6, and 8, i.e., a low, generally rectangular configuration with symmetrically disposed guide eyelets 84 at opposite ends thereof. However, the guide 82 of FIG. 9 preferably has some depth, as would be provided by cutting the guide 82 from a short length of extruded material having the proper cross-sectional configuration, or forming the device of various short lengths of square tubing or the like. This provides sufficient depth for the attachment of a short length of hinge material 86 to the opposite ends of the guide. Two such hinge segments 86 are disposed at each end, with one such segment being generally coplanar with the corresponding elongate surface of the guide.

Two opposed and spaced apart guide support blocks 88 are affixed to the base 12. The two blocks 88 are separated by a span identical to the span or length of the guide 82. Each block 88 includes a pair of hinge segments 90, with these hinge segments 90 mating with the corresponding hinge segments 86 of the guide 82 proper. Hinge pins securing the various hinge segments 86 and 90 to one another are provided by a pair of removable pins 92. The pins 92 may be tethered (not shown) to some portion of the structure to prevent their loss.

The above-described dispensing guide assembly permits the guide 84 to be installed in any of three different positions, as shown in FIG. 9. The guide 84 may be secured horizontally across the two support blocks 88, as shown in solid lines in FIG. 9, with one hinge pin 92 being installed through each of the opposite hinge segment assemblies 86 and 90. This configuration permits either eyelet 84 to be used to guide the dispensing of material from a spool or reel placed upon the dispenser, regardless of the orientation of the spool. Alternatively, one of the pins 92 may be removed from one end of the assembly, allowing the guide 84 to be rotated to a vertical orientation (with respect to the base 12), as shown in broken lines in FIG. 9. The removed pin 92 is then installed in the outboard hinge segment assembly to secure the guide 82 in an upright orientation, as shown in broken lines in FIG. 9.

In conclusion, the dispenser for coiled materials greatly facilitates the carriage and dispensing of various coiled materials. While the dispenser may be used to carry and dispense such coiled materials as cord, cable (electrical and non-electrical), rope, cord, chain, etc., it is particularly useful for the carriage and dispensing of electrical wire, such as Romex®, in electrical installations in various building structures. The small axial dimension of the device when used with a smaller coil of wire permits it to be passed between adjacent sixteen-inch on-center studs in an unfinished wall, thereby further increasing the utility of the device. Its versatility extends to the carriage and dispensing of wire from a larger spool by means of the removable caddy and handle extension and removal of the second reel flange from the device. Accordingly, the dispenser for coiled materials will prove to be a most valuable article of equipment for those engaged in the electrical trades, and/or for anyone who has need to carry and dispense coiled material of virtually any sort.

It is to be understood that the present invention is not limited to the embodiments described above, but encompasses any and all embodiments within the scope of the following claims.

The invention claimed is:

1. A dispenser for coiled materials, comprising:
   a base, the base having an upper surface and lower surface;
   a rotational bearing support plate assembly attached to the upper surface of the base;
   a first flange attached to the support plate assembly;
   an axle extending from the first flange;
   a second flange removably secured to the axle; and
   an adjustably positioned material dispensing guide attached to the upper surface of the base, the guide comprising:
      an elongated rectangular frame;
      symmetrically disposed first and second guide eyelets at opposite ends of the frame;
      spaced apart first and second hinge segments affixed to each of the guide eyelets;
      mutually opposed, spaced apart first and second guide support blocks affixed to the upper surface of the base adjacent the stationary bearing support plate assembly;
      spaced apart, third and fourth hinge segments affixed to each of the guide support blocks, the third and fourth hinge segments mating with the corresponding first and second hinge segments of the guide eyelets; and
      a pair of hinge pins removably disposed in the first through fourth hinge segments, the hinge pins securing the frame to at least one of the guide support blocks.

2. The dispenser for coiled materials according to claim 1, further including a bias spring urging the second flange toward the first flange, the spring-biased flanges being adapted for capturing a coil of material and preventing excessive play of the coil between the second flange and the first flange.

3. The dispenser for coiled materials according to claim 1, further including a wheeled caddy frame removably secured to the lower surface of the base opposite the bearing support plate assembly, a handle attached to the caddy frame and extending upwardly from the plane of the caddy frame.

4. The dispenser for coiled materials according to claim 1, wherein the base, the support plate assembly, the first flange, the first axle, and the second flange collectively define an axial width no greater than fourteen and one-half inches.

5. The dispenser for coiled materials according to claim 1, wherein the base, the first flange, and the axle are circular, the base having a larger diameter than the first flange and the second flange.

6. The dispenser for coiled materials according to claim 1, further including a plurality of removable coil centering guides extending from the first flange adjacent the axle.

* * * * *